Aug. 13, 1946.    R. D. SMEALLIE    2,405,799
BEARING
Filed May 30, 1945    4 Sheets-Sheet 1

INVENTOR
Robert D. Smeallie
BY
Pennie Davis Marvin Edmonds
ATTORNEYS

Aug. 13, 1946.    R. D. SMEALLIE    2,405,799
BEARING
Filed May 30, 1945    4 Sheets-Sheet 2
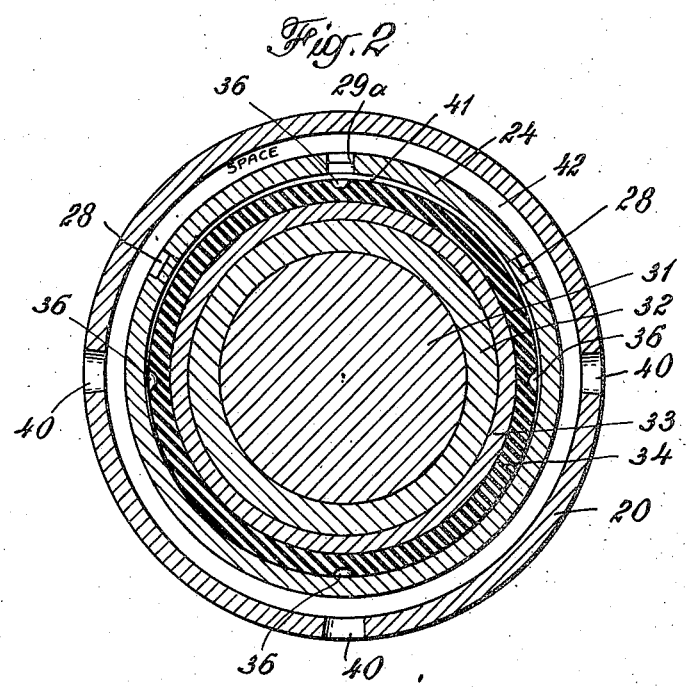
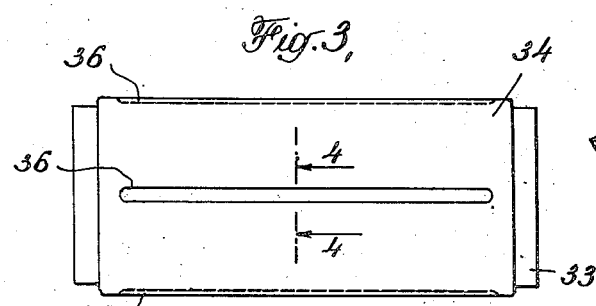
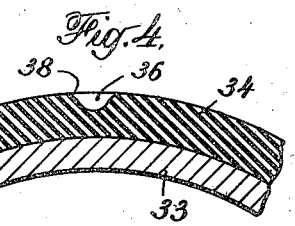
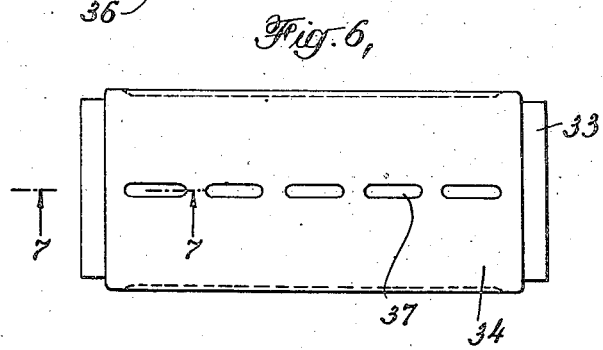
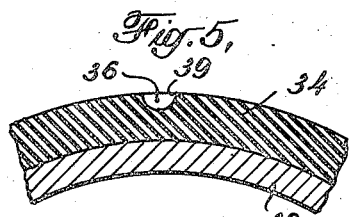
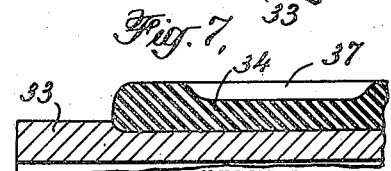
INVENTOR
Robert D. Smeallie
BY
ATTORNEYS Aug. 13, 1946. R. D. SMEALLIE 2,405,799
BEARING
Filed May 30, 1945 4 Sheets-Sheet 3
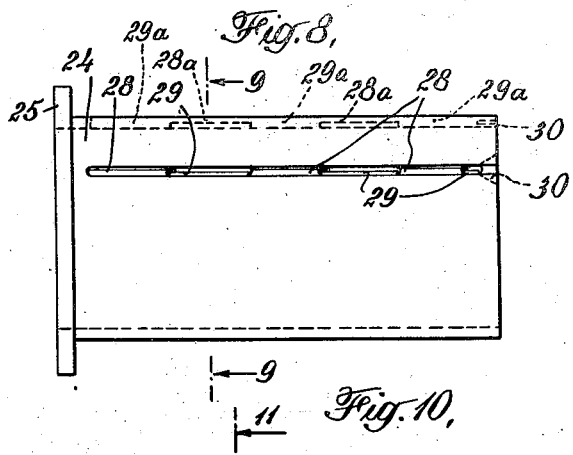
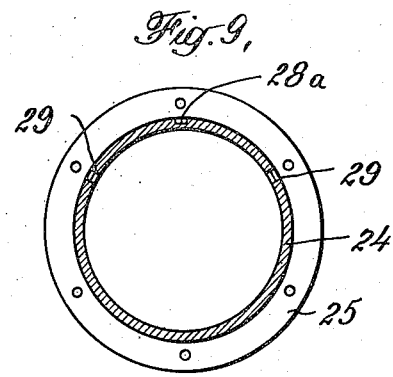
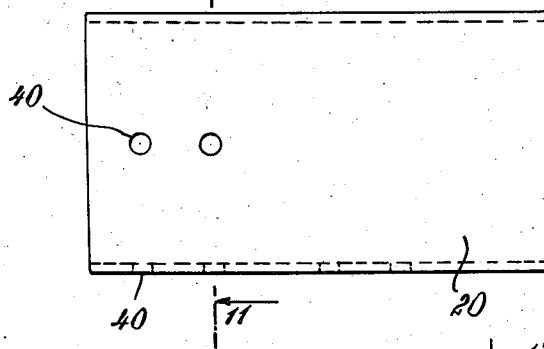
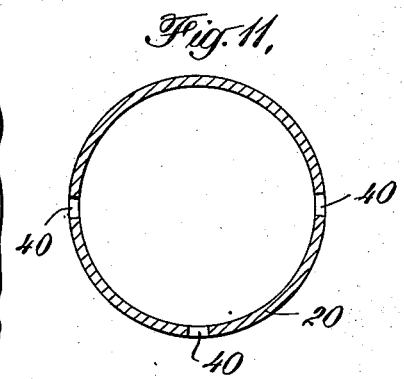
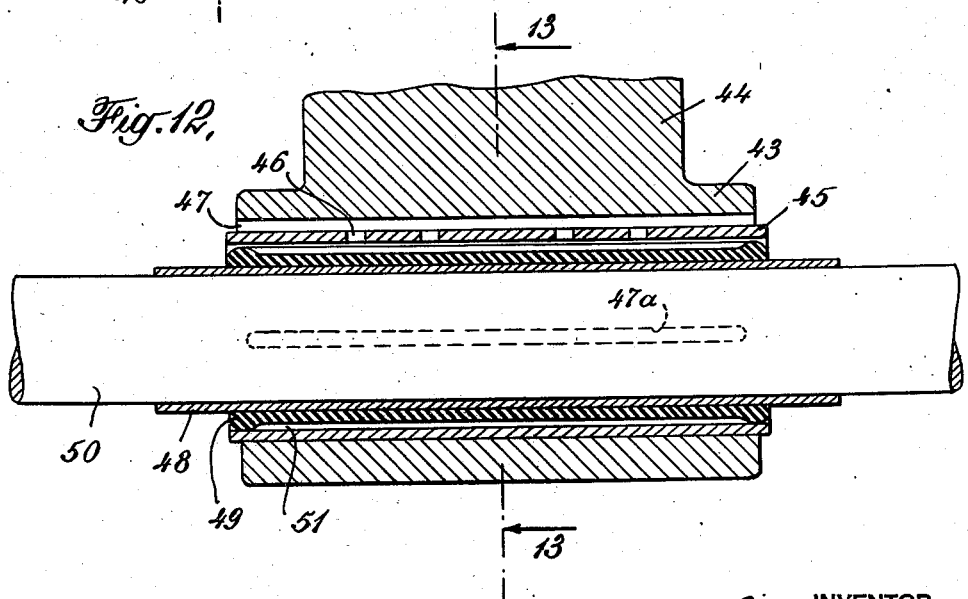
INVENTOR
Robert D. Smeallie
BY
ATTORNEYS Aug. 13, 1946.  R. D. SMEALLIE  2,405,799
BEARING
Filed May 30, 1945  4 Sheets-Sheet 4
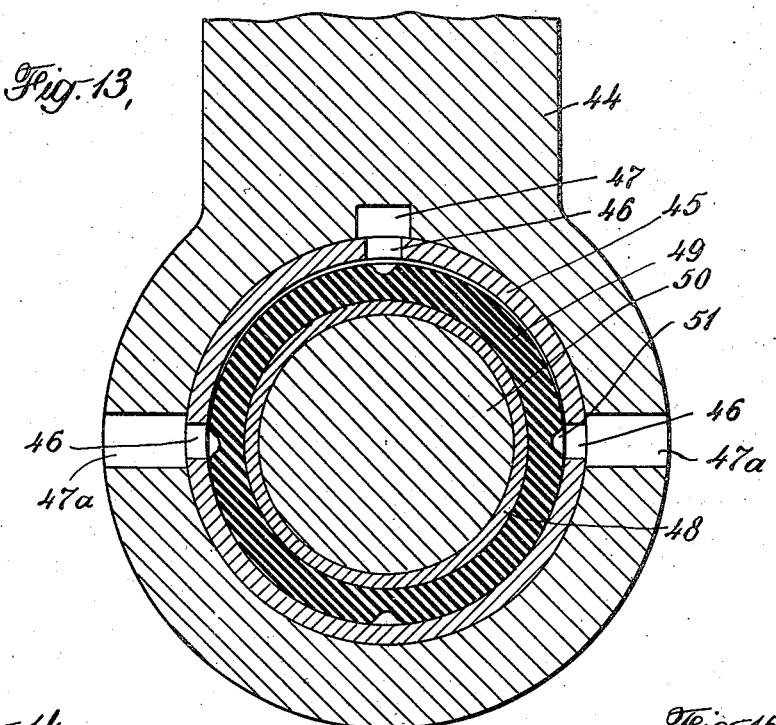
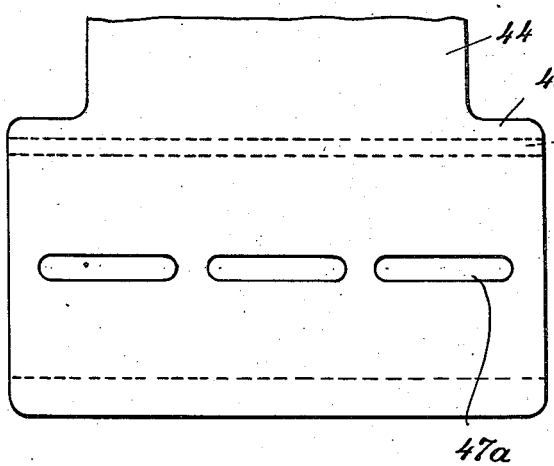
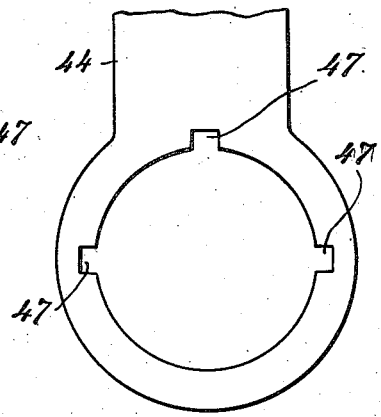
INVENTOR
Robert D. Smeallie
BY
Pennie Davis Marvin Edmonds
ATTORNEYS Patented Aug. 13, 1946

2,405,799

UNITED STATES PATENT OFFICE 2,405,799

BEARING

Robert D. Smeallie, Teaneck, N. J., assignor to The E. J. Willis Company, New York, N. Y., a corporation of New York Application May 30, 1945, Serial No. 596,666

15 Claims. (Cl. 308—240)

This invention relates to shaft bearings of the type which operate within a constantly maintained body of lubricating fluid, examples of such bearings being those used as outboard bearings for the propeller shafts of boats. More particularly, the invention is concerned with a novel shaft and bearing assembly for operation within a body of lubricant, which is superior to prior similar bearings in that the lubricating medium is more effectively used and the assembly is, therefore, less subject to wear. Also, when the new assembly is used for marine purposes on landing vessels operating in shoal water, the sand or other gritty material that enters the bearing is quickly washed away and thus does not have an opportunity to cut or score the working faces of the assembly.

While the bearing of the invention is adapted for both industrial and marine use, it offers special advantages when employed in landing craft, which operate under conditions which are unusually severe on outboard or stern tube bearings, because the water in which the bearings are wholly or partially immersed frequently contains sand or gritty material in suspension. Accordingly, a form of the new bearing suitable for such marine use will be illustrated and described in detail for purposes of explanation, although it will be evident that the invention is not limited to a bearing for that specific application.

Water lubricated bearings for the propeller shafts of boats have been in use for many years, and in such bearings as made heretofore, it has been common practice to mount a journal sleeve of soft rubber on the shaft and to support the sleeve within a stationary metal bearing member which may take the form of a bushing mounted in a housing. In the case of an outboard bearing, the housing may be the bearing block of a strut bracket, whereas, when the bearing is to be used in a stern tube, the bushing is secured against rotation within the outer end of the tube. The rubber journal sleeve is provided with longitudinal grooves or channels in its surface extending from end to end of the sleeve and open at both ends. In some constructions, the metal bushing has been formed with lengthwise channels in its inner and outer faces with the channels connected by passages extending through the bushing wall. In other constructions, the bushing has been lined with soft rubber formed with open ended channels, and, in that case the shaft itself forms the journal.

The theory of operation of such prior bearings is that the water in which the bearing is submerged in the outboard construction, will pass through the channels from end to end as the boat goes through the water, and lubricate the working surfaces of the sleeve and the bushing. In the stern tube construction, it is expected that water supplied under pressure to the stern tube will flow lengthwise of the bearing through the grooves to the outer end of the bearing and will serve as a lubricant.

As a result of tests conducted with bearings of the type described, I have discovered that such prior bearings are so constructed that no advantage is taken of the rotation of the shaft and the centrifugal effect obtainable therefrom. In those tests, I ascertained that by properly forming the stationary rotary elements of the assembly, I could use the centrifugal action of the rotary element to maintain a film of water under pressure throughout the area where the load is transmitted from one member of the assembly to the other. I also found that by proper construction of the two elements of the assembly, it it possible to develop a water pressure between the working surfaces of the assembly, which causes the water to wash out sand or gritty material and prevent accumulations thereof between the working surfaces which would tend to score or cut those surfaces.

The bearing assembly of the invention is constructed to produce the effects above described, and it includes a stationary outer member or bushing and a rotatable inner member, the members being formed of different material. In the operation of the bearing assembly, arcuate portions only of the opposed working surfaces of the bearing members are in contact and force is transmitted from one member to the other only through such contacting areas. Outside their contacting areas, the working surfaces are separated by a clearance space of crescent shape. A plurality of recesses are formed in the working surface of the inner member, and these recesses are spaced inwardly from the ends of the inner member, so that there is no open passage from end to end of the latter. The outer member is provided with a plurality of passages leading from its working surface to the exterior thereof, and the inner openings of those passages lead from the clearance space referred to. With the construction described I have found that water is drawn into the clearance space through the passages in the outer member and the ends of the space at the beginning of the space, considered in relation to the direction of rotation of the inner member, and pressure develops in the space toward the opposite end thereof. The pressure tends to discharge water from the space and thus flush the working surfaces of the members. A portion of the water, however, which has entered the recesses in the inner member from the clearance space is trapped in the recesses beyond the end of the space and, as a result of centrifugal action, the trapped water tends to maintain a film of water throughout the load areas of the working surfaces. Beyond the load areas and at the beginning of the clearance space, a partial vacuum develops which causes the intake of water above mentioned.

For a better understanding of the invention, reference may be had to the accompanying drawings in which Fig. 1 is a view in longitudinal section through a shaft and bearing assembly of the stern tube type constructed to embody the invention;

Fig. 2 is a sectional view on the line 2—2 of Fig. 1;

Fig. 3 is a view in side elevation of the journal sleeve employed in the construction shown in Fig. 1;

Fig. 4 is an enlarged sectional view on the line 4—4 of Fig. 3;

Fig. 5 is a view similar to Fig. 4 showing a modified construction;

Fig. 6 is a view similar to Fig. 3 showing a modified construction;

Fig. 7 is an enlarged sectional view on the line 7—7 of Fig. 6;

Fig. 8 is a view in side elevation of a bushing employed in the construction of Fig. 1;

Fig. 9 is a sectional view on the line 9—9 of Fig. 8;

Fig. 10 is a view in side elevation of a portion of the stern tube shown in Fig. 1;

Fig. 11 is a sectional view on the line 11—11 of Fig. 10;

Fig. 12 is a longitudinal section view on the new bearing assembly as used in a strut mounting;

Fig. 13 is a sectional view on the line 13—13 of Fig. 12;

Fig. 14 is a view in side elevation of a portion of a strut bracket similar to that shown in Fig. 12 but of modified construction; and Fig. 15 is an end view of another modified form of strut bracket of the type used in the Fig. 12 construction.

Figure 1:
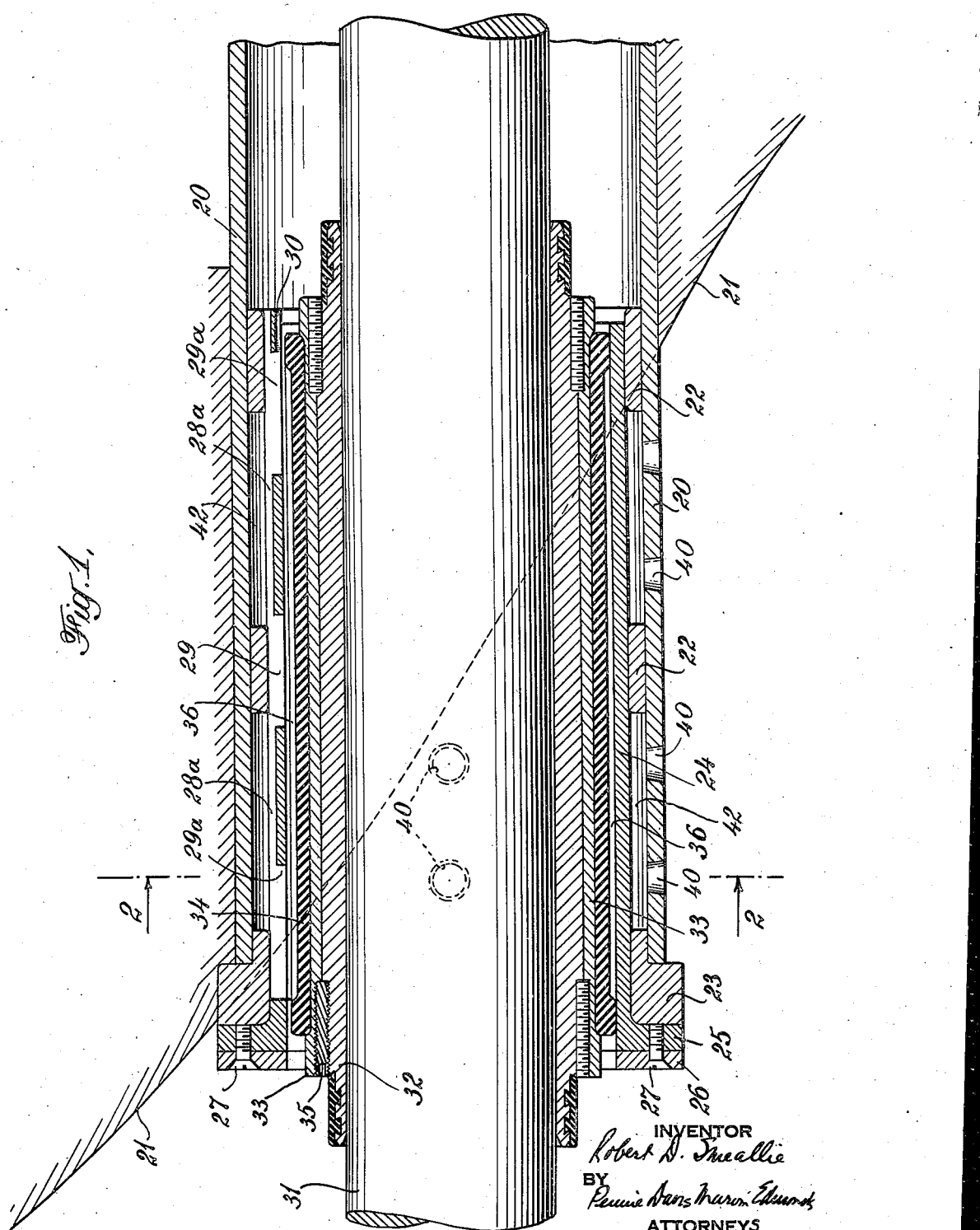

In Fig. 1, the new bearing assembly is shown in use in a stern tube 20 which projects through the surface of the hull 21 of a boat at the stern. Within this tube are mounted a pair of spacing rings 22 secured in place in spaced relation by welding and a spacing bushing 23 extends into the outer end of the tube.

In the construction shown, the bearing assembly proper includes a bushing 24 projecting into the stern tube and made of any suitable material, such as bronze, plastic of the phenolic condensation type reinforced by fabric, and others. The bushing fits tightly against the inner surfaces of the spacers 22 and 23, and it is formed with an end flange 25 overlying the outer end of bushing 23. A pair of semi-annular plates 26 of suitable metal resistant to corrision are mounted against the outer face of flange 25 and are held in place thereon by screws 27 threaded into the flange. A plurality of channels 28 are formed in the outer surface of the bushing above a horizontal plane through its axis and the channels extend lengthwise of the bushing parallel to the axis and are open at the inner end of the bushing opposite to that provided with flange 25. Alternate channels may vary in length, and, as shown in Fig. 8, channel 28 starts at a point nearer flange 25 than the next adjacent channel 28a. Passages 29 are formed in the wall of the bushing to connect the interior thereof with the channels, and there are a number of such passages opening into each channel. Thus channel 28 is shown as having three passages 29 spaced along its length, while channel 28a is also shown as provided with three passages 29a, the passages 29 and 29a being staggered, where possible. The inner surface of the bushing forms one working surface of the assembly and, if desired, the inner surface of the bushing may be cut away over a flared area 30 leading to the passage at the inner end of each channel.

In the bearing illustrated, there are three channels 28 lying above the horizontal plane, and the two lower channels are spaced upward 30° from the plane, and the intermediate channel is at the top of the bushing and spaced 60° from the two lower channels. The number of channels and their spacing will depend on the diameter of the bushing, the number of channels increasing with the size of the bushing.

The propeller shaft 31 is provided with a sleeve 32 shrunk or otherwise secured in place thereon, and this sleeve lies within bushing 24 and is of a length greater than the length of the bushing. A metal sleeve 33 encircles sleeve 32 and is enclosed within a sleeve 34 which is made of a material different from that used for bushing 24. Thus, if bushing 24 is of bronze, for example, sleeve 34 may be made of soft rubber vulcanized on sleeve 33 or, if sleeve 24 is of the reinforced plastic, sleeve 34 may be omitted, and sleeve 33 made of bronze. Sleeve 33 is held in place on sleeve 32 by screws 35 threaded into tapped openings formed partly in one sleeve and partly in the other.

The outer surface of sleeve 34 forms the second working surface of the bearing assembly, and a number of recesses 36 are formed in its surface. The recesses terminate inwardly from the ends of sleeve 34, and in the construction shown in Fig. 3, there are four such recesses spaced 90° apart about the sleeve and extending lengthwise thereof parallel to the axis. In some constructions, it may be desirable to use recesses of a different form, as, for example, that shown in Fig. 6, in which the recesses 37 are arranged in groups in which the recesses lie in a line. Recesses of other forms than those disclosed may also be employed, as well as other numbers of recesses.

The cross-sectional shape of the recesses is, preferably, that illustrated in Fig. 4, where it will be seen that the inner wall of each recess at the opening of the recess is convexly curved, as indicated at 38. During the operation of the bearing, the recesses contain water, and by the formation of the outer margins of the recesses on a convex curvature, the curved surfaces form wedging spaces tending to force water between the working surfaces, such wedging action being well known in bearing design. In some bearings, it may not be necessary to utilize the wedging action referred to, in which event the recesses may have side walls which intersect the periphery of the sleeve 34 along substantially radial lines, as indicated at 39.

If the stern tube 20 used with the new assembly projects beyond the hull of the vessel, a number of openings 40 are formed through the part of the tube so exposed. In the construction shown in Figs. 1 and 10, the exposed part of the tube has four openings in its bottom in a vertical plane through its axis and two openings in either side in a horizontal plane through the axis.

When the assembly shown in Figs. 1 to 11, inclusive, is installed in a boat, the weight of the shaft and propeller is supported on a lower arcuate portion of bushing 24 and, since the inner diameter of that bushing is somewhat greater than the outer diameter of sleeve 34, a clearance space 41 of crescent shape (Fig. 2) develops between the top of sleeve 34 and the bushing 24. Force is, accordingly, transmitted through lower arcuate portions only of the sleeve and bushing.

In the operation of the bearing assembly, water is maintained within the interior of the stern tube and passes through channels 28 in bushing 24 into the spaces 42 between the outer surface of the bushing and the interior of the tube between spacer rings 22 and bushing 23. If the water so supplied is under pressure, the pressure is substantially lower than is ordinarily used, as, for example, it may be only two pounds as against thirty pounds or more. From the spaces 42, the water flows through passages 29 in bushing 24 into the clearance space 41 and into contact with the working surfaces of the bushing and sleeve 34, and the water enters the recesses 36 in the surface of the sleeve.

While I am not sure of the exact manner in which the water functions within the bearing assembly, I have obtained the following information relative to conditions within the assembly by means of tests. In those tests, I tapped the wall of the bushing 24 to its inner surface at points spaced around its circumference and lying 45° apart, these points being about midway of the length of the bushing. I mounted tubes in the openings so formed and connected the tubes to an equalizing tank on which was mounted a manometer capable of giving vacuum readings up to thirty inches and pressure readings up to ten pounds. The tubes were provided with valves so that individual readings of pressure or vacuum could be obtained at the intake of each tube. With the shaft operating at 1600 R. P. M. in a clockwise direction and a substantial load transmitted from the inner to the outer member of the assembly, I found that at the tube opening in the bottom of the assembly in the vertical plane through the axis of the shaft, the maximum pressure, which was of the order of several pounds, was developed. At the next tube opening clockwise about the assembly, the pressure had fallen to a few ounces. At the third opening, which lay in the horizontal plane through the shaft axis and was open to the clearance space 41, a substantial vacuum of the order of several inches of water had developed and the vacuum condition prevailed at the fourth tube opening, and also at the fifth, which lay at the top of the assembly in the vertical plane through the shaft axis. At each of the sixth, seventh, and eighth openings, a pressure condition prevailed, the pressure increasing from a value of about half a pound to a value somewhat over a pound at the eighth opening.

The readings above set forth indicate that, at the tube openings where vacuum readings are given, water is entering the clearance space between the bushing and the rotary sleeve through the passages through the bushing wall and at the ends of the space. The pressure readings start just beyond the top of the clearance space where its cross-section begins to diminish and the indications of pressure show that water is being discharged from the space under pressure. At the point at the bottom of the assembly where the maximum pressure is registered, the water in the recesses in the sleeve is trapped and cannot escape and the pressure develops because of centrifugal action. The trapped water under pressure maintains a lubricating film between the working surfaces at all times.

The readings at the second and eighth points which lie on opposite sides of the lowest point both indicate pressure, with the higher pressure at the eighth point. This indicates that the load has been redistributed and that the arcuate portions of the working surfaces through which the load is transmitted have been shifted angularly counter-clockwise or against the direction of rotation of the shaft. The crescent shaped clearance space has been similarly shifted counter-clockwise, which may explain the specific readings of pressure and vacuum at the various points of observation.

I have made tests similar to those above described on a conventional bearing assembly in which the bearing is provided with channels extending from end to end thereof and open at both ends, and in those tests, indications of vacuum and pressures of very small values were obtained at the different points about the assembly. Also, at some speeds and loadings, indications of a slight vacuum were obtained directly under the point of maximum load. This was probably the result of water being forced out of the ends of the channels under load, and it is to be contrasted with the indication of maximum pressure at the point of maximum load in the new bearing assembly. Since the new bearing has shown greatly superior wearing qualities as compared with a conventional bearing, it is apparent that the formation of the rotor with recesses in which water can be trapped and subjected to centrifugal action to maintain a lubricating film affords important advantages not available in prior constructions.

In the form of the new assembly shown in Figs. 12 to 15, inclusive, the assembly is mounted in a bearing block 43 at the lower end of a strut bracket 44 and comprises a bushing 45, which may be of bronze or other suitable material and is securely mounted within block 43 against rotation. The bushing has a number of passages 46 arranged in lengthwise rows in the upper part of the bushing, and, in the construction illustrated, there are four such passages in each row and there are three rows of passages, two lying diametrically in a horizontal plane through the axis of the bushing, and one row lying at the top of the bushing in a vertical plane through the axis. The bearing block is formed with passages aligned with passages 46, and the top passage 47 may take the form of a channel extending through the bearing block from end to end, and the side passages 47a may be openings drilled through the wall of the block.

A metal sleeve 48, on the outside of which a sleeve 49 of suitable material, such as soft rubber, is secured, is mounted on shaft 50 in any suitable manner. Sleeve 49 is formed with recesses 51 in its surface, and these recesses are illustrated as extending axially of the sleeve and terminating short of the ends thereof. Instead of forming the bearing block 43 with side openings 47a, it may be provided with lateral internal channels similar to passage 47 and extending from end to end of the block. Also, the block may be bored out to a greater diameter than bushing 45 and spacers similar to rings 22 may be inserted in the opening of the block to receive the bushing 45. This arrangement provides circumferential channels around the bushing and these channels may be supplied with water through a channel 47 or passages 47a. Channels 47 and passages 47a provide spaces for the intake or discharge of water, according to the direction of rotation of the shaft.

The shaft and bearing assembly illustrated in Figs. 12 to 15, inclusive, functions in the same manner as that previously described, except that the entire assembly is submerged in the water in which the boat is afloat. At certain points around the axis of the shaft, vacuum conditions prevail in the clearance space between the sleeve 49 and the bushing 45 and water is drawn into the space through passages 47 and 47a in the bearing block and passages 46 in the bushing and also at the ends of the clearance space. At other points around the shaft, pressure develops and at some of those points, water can escape from the space either at the ends of the space or through the passages 47, 47a, and 46. At points below the horizontal where the bushing 45 is solid, the water trapped in the recesses 51 in sleeve 49 tends to be thrown out centrifugally by the rotation of the shaft and a film of water is maintained between the working surfaces of the rotary and stationary members by such centrifugal action.

In life tests of bearings of the invention and those of conventional construction, the bearings were placed under load and operated in water containing a substantial amount of sand and it was found that, in the period of time in which the prior bearing had become worn to the point where replacement was required as a result of the abrasive action of the sand, the new bearing had become worn only to a minor extent and had many more hours of life available. Under the test conditions, no substantial scoring of the working surfaces of the new bearing was found and the wear was comparatively uniform, whereas, in the prior bearing, bad scoring had occurred.

In the constructions illustrated and described, the rotary member has been provided, for example, with a soft rubber surface and the stationary member has a metal surface. It will be apparent, however, that the opposite arrangement could be used, if desired, with the rubber sleeve stationary and forming the bushing in which the metal rotor operates. With such reversed arrangement, the recesses, such as 36 and 51 are formed in the surface of the rotor, and passages 29 formed through the rubber surface and leading to channels 28, preferably, formed in the outer surface of a bushing for which the rubber sleeve forms a liner. The arrangement shown is preferred because the wear is limited to an arc of approximately 120° at the bottom of the stationary sleeve, whereas the entire circumference of the rotary member provides wearing surface. It is, therefore, preferable to utilize the rubber for the rotary member so that a greater area of the rubber takes the wear.

In the foregoing, I have described embodiments of the invention suitable for marine use in which water supplied through the stern tube of the vessel or the water, in which the vessel is afloat, acts as a lubricant. In such applications of the new bearing assembly, best results are obtainable by forming the stationary bushing of bronze and the rotary sleeve of rubber, although the combination of a stationary bushing of reinforced plastic of the phenolic condensation type and a rotary sleeve of bronze is satisfactory under some conditions. In industrial use in which the assembly lies within a bath of oil constantly maintained, various other combinations of materials may be used for the bearing members, as, for example, a stationary bushing of bronze and a steel sleeve on the shaft. While the shaft itself might serve as the rotary member, it is desirable to mount a sleeve upon the shaft to rotate with it so that in the event of wear, the sleeve, rather than the shaft, may be replaced.

I claim:

1. In a shaft and bearing assembly, the combination of a stationary outer member and a rotatable inner member lying within the outer member, the members having opposed working surfaces made of different materials, pressure being applied by one member to the other through arcuate portions only of said surfaces during the rotation of the inner member, a plurality of recesses in the working surface of the inner member, said recesses being spaced inwardly from the ends of said surfaces, and a plurality of passages in said outer member leading to the exterior thereof from the working surface of the outer member, the openings of said passages all lying outside said arcuate portion of the working surface of said member.

2. In a shaft and bearing assembly, the combination of a stationary outer member and a rotatable inner member lying within the outer member and supported thereby, the members having opposed working surfaces made of different materials, the weight of the inner member being carried by a lower arcuate portion only of the working surface of the outer member, a plurality of recesses in the working surfaces of the inner member, said recesses lying spaced inwardly from the ends of said surfaces, and a plurality of passages in said outer member leading to the exterior thereof from the working surface of the outer member, the openings of said passages lying within the upper portion of said working surface.

3. In a shaft and bearing assembly, the combination of a stationary outer member having an internal working surface of metal, a rotatable inner member having a working surface of rubber, pressure being applied by one member to the other through arcuate portions only of said working surfaces during the rotation of the inner member, a plurality of recesses in the working surface of the inner member spaced inwardly from the ends of the surfaces, and a plurality of passages in the outer member leading from the working surface of the member to the exterior thereof, the inner openings to the passages lying outside said arcuate portion of the working surface of said member.

4. In a shaft and bearing assembly, the combination of a housing, an outer member mounted in fixed position in the housing and having an internal working surface of metal, said inner member mounted for rotation in the outer member and having a working surface of rubber, the weight of the inner member being carried by a lower arcuate portion only of the working surface of the outer member, a plurality of recesses in the working surfaces of the inner member, said recesses extending generally axially of the inner member and terminating short of the ends of the working surfaces, and a plurality of passages in the outer member leading from the working surface of the member to the exterior thereof, the inner openings of the passages lying outside said arcuate portion of the working surface of said member.

5. A shaft and bearing assembly which comprises a housing, an outer member mounted in fixed position in the housing, an inner member mounted for rotation in the outer member, the members having opposed working surfaces, one of which is of metal and the other of rubber, pressure being applied by one member to the other during the rotation of the inner member through arcuate portions only of said surfaces, a plurality of recesses in the working surface of the inner member and spaced inwardly from the ends of said surfaces, a plurality of passages in said outer member leading from the working surface of said member to the exterior thereof, the openings of said passages lying outside said arcuate portion of the working surface, and passages in said housing communicating with the outer ends of the passages through the outer member and leading to the exterior of the housing.

6. A shaft and bearing assembly which comprises a housing, an outer member mounted in fixed position in the housing and having an internal working surface of metal, an inner member mounted for rotation in the outer member and having a working surface of rubber, the weight of the inner member being transmitted through a lower arcuate portion only of the rubber working surface to a similar arcuate portion only of the metal working surface, a plurality of recesses in the rubber working surface spaced inwardly from the ends of the working surfaces, a plurality of passages in the outer member leading from the working surface of said member to the exterior thereof, the intakes of said passages lying outside said arcuate portion of said working surface, and passages in the housing communicating with the outer ends of the passages through the outer member and leading to the exterior of the housing.

7. In a shaft and bearing assembly, the combination of a metal bushing, the inner surface of which is a working surface of the assembly, a shaft having a rubber sleeve lying within the bushing, the surface of the rubber sleeve forming the second working surface of the assembly, the bushing supporting the shaft during the operation of the assembly and the working surfaces contacting over lower arcuate portions only, a plurality of recesses in the surface of the rubber sleeve spaced inwardly from the ends of the working surfaces, and a plurality of passages leading through the wall of the bushing from the working surface to the exterior of the bushing, the inner ends of said passages lying outside said lower arcuate portion of the bushing.

8. In a shaft and bearing assembly, the combination of a metal bushing, the inner surface of which is a working surface of the assembly, a shaft having a rubber sleeve lying within the bushing, the surface of the rubber sleeve forming the second working surface of the assembly, the bushing supporting the shaft during the operation of the assembly and the working surfaces contacting over lower arcuate portions only, a plurality of elongated recesses in the surface of the rubber sleeve extending generally axially of the sleeve and terminating short of the ends of the sleeve and the bushing, and a plurality of passages leading through the wall of the bushing from the working surface to the exterior of the bushing, the inner ends of said passages lying outside said lower arcuate portion of the bushing.

9. In a shaft and bearing assembly, the combination of a metal bushing, the inner surface of which is a working surface of the assembly, a shaft having a rubber sleeve lying within the bushing, the surface of the rubber sleeve forming the second working surface of the assembly, the bushing supporting the shaft during the operation of the assembly and the working surfaces contacting over lower arcuate portions only, a plurality of elongated recesses in the surface of the rubber sleeve extending generally axially of the sleeve and terminating short of the ends of the working surfaces, the recesses being angularly spaced around the sleeve, and a plurality of passages leading through the wall of the bushing from the working surface to the exterior of the bushing, the inner ends of said passages lying outside said lower arcuate portion of the bushing.

10. In a shaft and bearing assembly for use on a vessel having a stern tube through which the shaft projects, a portion of the stern tube being exposed outside the hull of the vessel and the tube being supplied with water under pressure from the interior of the vessel, the combination of a bushing mounted within the rear end of the stern tube in spaced relation thereto, the inner surface of the bushing forming one working surface of the assembly, a shaft extending through the bushing, a rubber sleeve on the shaft lying within the bushing, the outer surface of the sleeve forming the second working surface of the assembly, a plurality of recesses formed in the surface of the sleeve and terminating inwardly from the ends thereof, a plurality of passages through the wall of the bushing connecting its inner and outer surfaces, the inner ends of the passages lying within an upper arcuate portion only of the inner surface of the bushing, and openings through the wall of the portion of the stern tube exposed beyond the hull of the vessel.

11. In a shaft and bearing assembly for use on a vessel having an outboard strut extending below the water line of the vessel, the combination of a bearing block carried by the strut and lying immersed and having an opening therethrough, a bushing mounted in said opening, the bushing having openings through its wall from the inner to the outer surface of the bushing, the inner ends of the openings lying in the upper part of the inner surface of the bushing and the lower part of said inner surface being solid, a shaft extending through the bushing, a rubber sleeve on the shaft within the bushing, a plurality of recesses formed in the surface of the sleeve and lying inwardly from the ends of the sleeve and bushing, and passages in the bearing block communicating with the outer ends of the openings in the bushing wall and leading to the exterior of the block.

12. In a shaft and bearing assembly, the combination of a stationary outer member and a rotatable inner member lying within the outer member, the members having opposed working surfaces, one of which is of metal and the other of rubber, pressure being applied by one member to the other through arcuate portions only of said surfaces during the rotation of the inner member, a plurality of recesses in the working surface of the inner member, said recesses being spaced inwardly from the ends of said surfaces, and a plurality of passages in said outer member leading to the exterior thereof from the working surface of the outer member, the openings of said passages all lying outside said arcuate portion of the working surface of said member.

13. In a shaft and bearing assembly, the combination of a stationary outer member and a rotatable inner member lying within the outer member and supported thereby, the members having opposed working surfaces, one of which is of metal and the other of rubber, the weight of the inner member being carried by a lower arcuate portion only of the working surface of the outer member, a plurality of recesses in the working surface of the inner member, said recesses lying spaced inwardly from the ends of said surfaces, and a plurality of passages in said outer member leading to the exterior thereof from the working surface of the outer member, the openings of said passages lying within the upper portion of said working surface.

14. In a shaft and bearing assembly, the combination of a stationary outer member and a rotatable inner member lying within the outer member, the members having opposed working surfaces, one of which is metallic and the other non-metallic, pressure being applied by one member to the other through arcuate portions only of said surfaces during the rotation of the inner member, a plurality of recesses in the working surface of the inner member, said recesses being spaced inwardly from the ends of said surfaces, and a plurality of passages in said outer member leading to the exterior thereof from the working surface of the outer member, the openings of said passages all lying outside said arcuate portion of the working surface of said member.

15. In a shaft and bearing assembly, the combination of a stationary outer member and a rotatable inner member lying within the outer member and supported thereby, the members having opposed working surfaces, one of which is metallic and the other non-metallic, the weight of the inner member being carried by a lower arcuate portion only of the working surface of the outer member, a plurality of recesses in the working surface of the inner member, said recesses lying spaced inwardly from the ends of said surfaces, and a plurality of passages in said outer member leading to the exterior thereof from the working surface of the outer member, the openings of said passages lying within the upper portion of said working surface.

ROBERT D. SMEALLIE.